Feb. 21, 1933. J. A. NORDIN 1,898,139
DRIVING AGGREGATE FOR MOTOR POWER AND HAND POWER
Filed Dec. 18, 1930 2 Sheets-Sheet 1
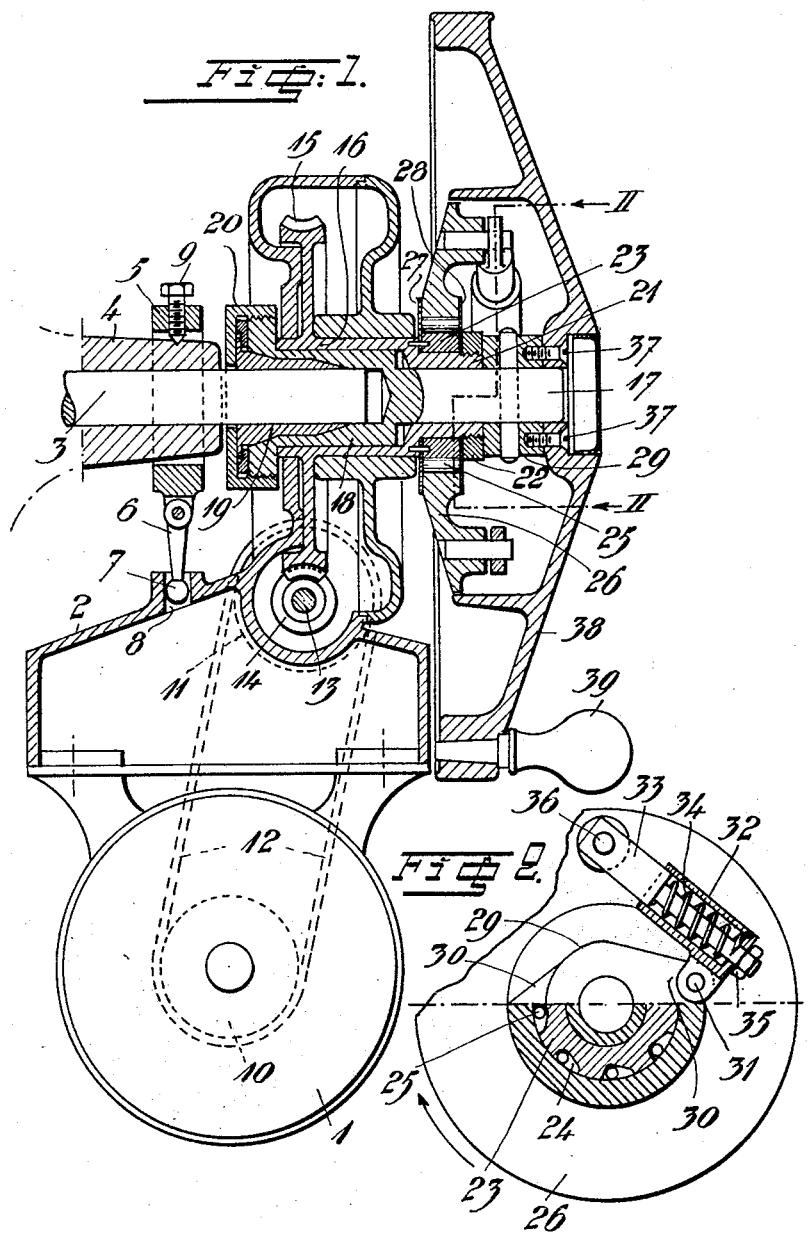

Feb. 21, 1933. J. A. NORDIN 1,898,139
DRIVING AGGREGATE FOR MOTOR POWER AND HAND POWER
Filed Dec. 18, 1930 2 Sheets-Sheet 2
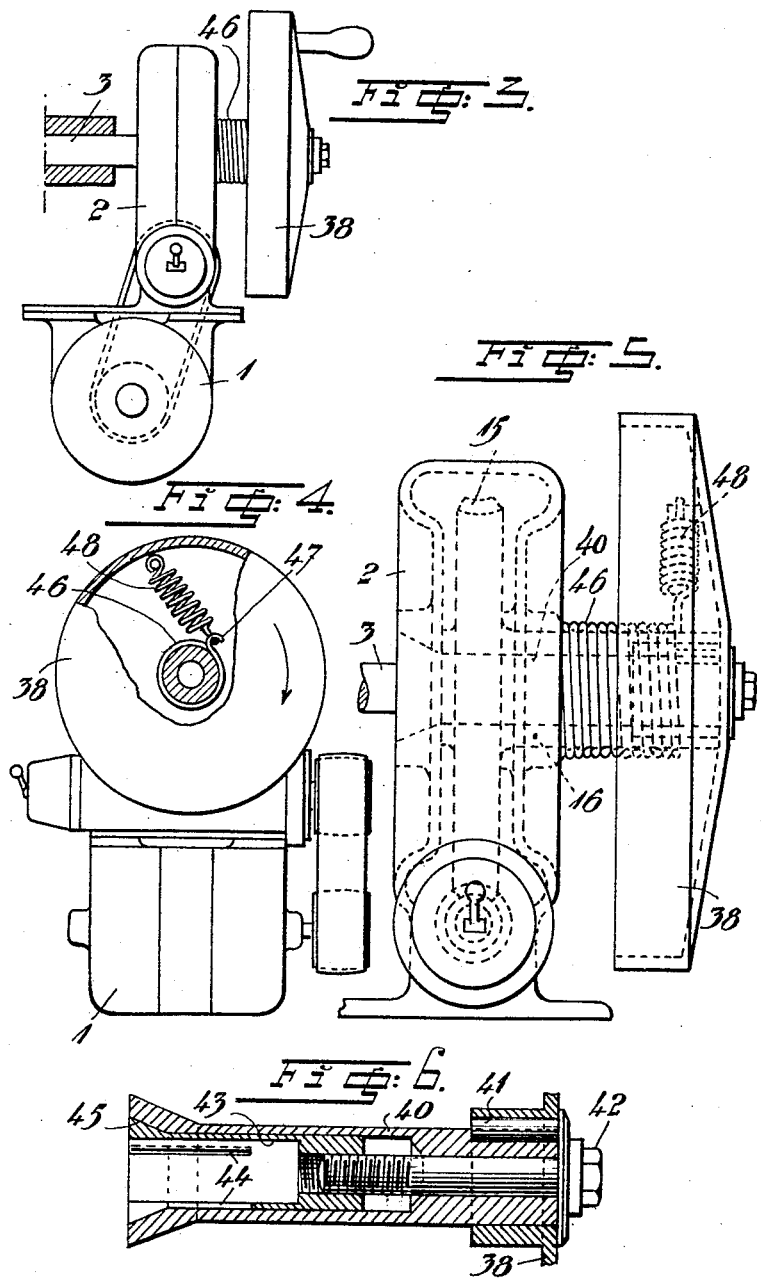

Patented Feb. 21, 1933

1,898,139

UNITED STATES PATENT OFFICE

JOSEF AUGUST NORDIN, OF STOCKHOLM, SWEDEN, ASSIGNOR TO AKTIEBOLAGET STILLE WERNER, OF STOCKHOLM, SWEDEN, A CORPORATION OF SWEDEN

DRIVING AGGREGATE FOR MOTOR POWER AND HAND POWER

Application filed December 18, 1930, Serial No. 503,273, and in Sweden April 5, 1930.

In machines of that type, which are adapted to be driven for instance by an electric motor mounted on the machine, it may happen, that the switch or the conductors are damaged, so that the motor power can not be used. The possibility of driving the machine manually also often is excluded in consequence of the comparatively great resistance exerted by the gearing between the motor and the machine and by the motor and the machine and by the motor proper. For that reason it has been necessary not to use the machine until a repairer has put the things to rights. This, evidently, involves disadvantages, especially in such cases, in which the machines are used in connection with the selling of special goods, for instance in meat slicing machines.

The object of this invention, which relates to a driving aggregate for motor power and hand power, is to remove the said disadvantage, so that, as soon as the using of the motor power is excluded, the machine directly may be operated manually by the gearing and motor being automatically disengaged from the motion transmitting means of the machine.

According to the invention the driving aggregate comprises a hand wheel or the like adapted to be driven manually and fixed to the shaft to be driven, mechanical driving means for the said shaft and a coupling device, which is provided between the shaft and the mechanical driving means and is operative for the transmitting of motion from the mechanical driving means to the shaft in a certain direction but inoperative, while the machine is driven manually in the same direction for the purpose that in the case last mentioned the mechanical driving means may be automatically disengaged.

As a coupling device preferably a so called ball-or roller-clutch is used. A screw shaped spring which with a slight friction encloses a cylindrical part or member of the mechanical driving means and is connected with the hand wheel as well as any other suitable coupling device may, however, be used.

Two forms of execution of the invention are illustrated in the accompanying drawings, adapted to meat slicing machines driven by an electric motor.

Fig. 1 is a vertical section of a driving aggregate according to one form of execution. Fig. 2 is a section on the line 2—2 in Fig. 1. Fig. 3 is a side view of a driving aggregate according to the second of execution. Fig. 4 is an end view partially a section of the aggregate shown in Fig. 3. Figs. 5 and 6 show details on a greater scale.

1 is an electric motor, which is fixed in a suitable manner to a gear casing 2 or the like, adapted to be mounted on the end of a shaft 3. The said shaft 3 may constitute for instance the driving shaft of a meat slicing machine but owing to the fact that the construction of the said machine forms no part of this invention it is not shown nor described. 5 is a ring, which is fixed on the bearing 4 of the shaft 3 in an adjustable manner by means of a set-screw 9 and provided with a pin 6, the spherical end 7 of which engages an opening 8 in the casing 2 and thus prevents the casing from turning on the shaft 3 but is held in a certain position on the same.

Motor 1 is provided with a belt pulley 10 and round the said pulley and a pulley 11 fixed on a shaft 13, journaled in the casing 2 a belt 12 is placed. Shaft 13 is provided with a worm 14 engaging a worm wheel 15. Said worm wheel 15 has a hub 16 rotatably mounted on a shaft 17, which is located co-axially to the shaft 3. The inner end 18 of the shaft 17 is sleeve-shaped and slid on the end of the shaft 3. Sleeve 18 is jammed to the shaft 3 by means of a split, conical sleeve 19 or the like, which may be forced into the space between the shaft 3 and the sleeve 18 by means of a nut 20 screwed on the sleeve 18, so that the shaft 17 is firmly connected to the shaft 3.

A ring 23 is slid on the turned, narrower end of the hub 16 and fixed to the same by means of a nut 22 or in any other suitable manner. A number of recesses 24 tapering in one direction are provided in the periphery of the said ring, in which balls or rollers 25 are located, Fig. 2. A disc 26 is mounted on the ring 23 and the rollers 25 and is held in position by means of lateral plates 27 and 28. The said ring 27, the rollers 25 and the disc 26 together constitute a so called roller clutch, the outer member (the disc 26) of which can rotate freely in the direction indicated by the arrow, shown in Fig. 2. If on the other hand the inner member (the ring 24) is rotated in the same direction, the disc 26 will be connected to the ring 23 by the roller 25 entering the narrower part of the recesses 24.

A ring 29 is fixed on the shaft 17 and provided with projections 30, Fig. 2. A sleeve 32 is pivoted at 31 to each projection 30 and a piston 33, pivoted at 36 to the disc 26, is slidably mounted in the sleeve 32. A screw shaped spring 34 provided in the sleeve 32 tends to move the piston outwards, the movement being limited by a nut 35 in screw-threaded engagement with the piston rod. A hand wheel 38 is fixed to the ring 29 by means of screws 37. The said wheel 38 covers the roller clutch and members belonging to the same and is provided with a handle 39, which is so arranged, that it may easily be removed, when the machine is not driven manually. A handle which is turned automatically toward the centre of the wheel may also be used. Such a handle may consist of two links pivoted to one another and acted upon by a spring in such manner, that the outer link is turned towards the inner link.

Assuming, that the motor is started and that the rotary motion is transmitted by pulley 10, belt 12, pulley 11, worm 14, worm wheel 15 and hub 16, 21, so that the ring 23 is caused to rotate in the direction indicated by the arrow shown in Fig. 2. The roller clutch now enters into operation automatically, owing to the fact that the rollers 25 pass into the narrow part of the recesses 24 and locks the disc 26 to the ring 23. Consequently, the disc 26 is rotated in the direction indicated by the arrow, which results in the pistons 33 compressing the springs 34 in a certain degree and finally bringing with themselves the ring 29, from which the rotary motion is transmitted by the shaft 17 to the shaft 3, which consequently, is driven by the motor in the direction, indicated by the arrow. Owing to the springs 34 the machine is started in a soft manner without shocks.

If the motor or the conductors should be damaged, one may pass over to manual operation without further trouble. One only grasps the handle 39 and rotates the hand wheel 38 in the direction indicated by the arrow in Fig. 2. The rotary motion then is transmitted directly to the shaft 17 and the shaft 3. The ring 29 brings with itself the disc 26 by the aid of the pistons 33, it is true, but the disc is disconnected automatically from the ring 23, owing to the fact that the rollers 25 pass into the deeper part of the recesses 24. Consequently, the ring 23 does not partake in the rotary motion and no rotary motion is transmitted to the hub 16, 21, worm wheel 15 and motor 1 or, in other words, the hand wheel has been disengaged automatically from the gearing and motor, which is of great importance, because the resistance exerted by the same generally is so great, that the manual operation would be rendered impossible, if the motor and gearing should partake in the motion. Further, it is of importance that the disengagement is effected entirely automatically, without any manipulations being effected by persons, who possibly are not conversant with mechanical devices. Finally it is generally of great importance that the machine may easily be adjusted manually, after the motor has been brought to a standstill. Regarding for instance meat slicing machines it is seldom possible to time the stopping of the motor so exactly, that the different members of the machine occupy the desired position.

The form of execution shown in Figs. 3 to 6 inclusive differs from the one described above chiefly thereby, that as connecting means between the gearing and the hand wheel a screw shaped spring is used instead of the roller clutch.

The motor 1 is connected with the worm wheel 15 in the gear casing 2 in substantially the same manner as described above. The hub 16 of the worm wheel 15 is rotatably mounted on a sleeve 40, the one end of which may be connected to the shaft 3. The hand wheel 38 is fixed on the other end of the sleeve 40 by means of a key 41 and a screwthreaded bolt 42. The said bolt 42 is screwed into a sleeve 43, which is located in the sleeve 40 and in which slots 44 are provided, which, as the screw bolt 42 is tightened, permit the sleeve 43 to be jammed to the shaft 3 by means of conical surfaces 45. The sleeve 43 may be replaced by a similar sleeve having a greater or less diameter, so that, practically, one is independent of the diameter of the driven shaft.

A screw-shaped spring 46 is mounted on the shaft 16 and bears against the hub with a slight friction. The outer end of the spring is shaped into a hook 47, to which is hitched the one end of a spring 48, the other end of which is connected to the hand wheel 38.

As the motor is started, the rotary motion is transmitted to the hub 16 in the same manner as previously described. The slight friction action between the hub and the spring 46 tightens the spring on the hub and owing to the resistance exerted by the hand wheel against the conveying action of the spring the latter finally is so tightened, that it does not slide on the hub. The spring 46 now transmits the driving power to the hand wheel and the shaft 3. The spring 48 provided between the spring 46 and the hand wheel yields at the beginning of the motion transmission, so that the starting of the machines is effected in a soft manner.

If hand power is to be used, the hand wheel is turned in the direction indicated by the arrow in Fig. 4. The rotary motion then, evidently, is transmitted by the sleeves 40 and 43 directly to the shaft 3, while the spring 46 is wholly untightened and slides on the hub 16. Consequently, the hand wheel 38 is disengaged automatically from the gearing and the motor, which involves the advantages described above in connection with the construction shown in Figs. 1 and 2.

Evidently, many other forms of execution and modifications are possible within the limits of this invention, which consequently is not limited to the forms of execution described above and shown in the drawings. Especially the coupling device may be varied and any other coupling device which operates in the same manner as those described above may, evidently, be used.

The driving aggregate as a whole is especially usable in combination with meat slicing machines and may easily be mounted on such machines, as originally were adapted to be driven only manually. The whole aggregate is mounted on the ordinary driving shaft of the machine and is carried by the same and no changings of the machine proper are necessary, which, evidently, is a great advantage. The machine previously driven only manually may hereby easily and without great expenses be changed to a machine driven by motor-power, which machine however at any time may be driven manually. The invention, evidently, is of great importance for household machines and for machines generally at which manual operation occasionally is desired or changing from manual operation to motor operation is to be effected.

I claim:

1. Driving aggregate comprising a shaft, means for detachably fixing said shaft to a shaft of a machine to be driven, a hand-wheel fixed to the first shaft, a hub rotatably mounted on the first shaft, a motor supported by a casing surrounding said hub, a gearing between the motor and the hub, an overrunning clutch between the hub and the hand-wheel, said clutch being operative as the gearing is driven by the motor in a certain direction but inoperative as the hand-wheel is turned in the same direction, and means for detachably supporting the driving aggregate as a whole on the shaft of the machine to be driven.

2. Driving aggregate as claimed in claim 1, characterized by the fact that between the driving aggregate and the machine are provided means for holding the casing in a fixed position in relation to the machine.

In testimony whereof I have hereunto affixed my signature.

JOSEF AUGUST NORDIN.